(12) United States Patent
Yang

(10) Patent No.: US 11,599,736 B2
(45) Date of Patent: Mar. 7, 2023

(54) BAR CODE, BAR CODE READER AND COFFEE MACHINE

(71) Applicant: PixArt Imaging Inc., Hsin-Chu (TW)

(72) Inventor: Shu-Sian Yang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/517,681

(22) Filed: Nov. 3, 2021

(65) Prior Publication Data
US 2022/0335236 A1     Oct. 20, 2022

Related U.S. Application Data

(60) Provisional application No. 63/176,899, filed on Apr. 20, 2021.

(51) Int. Cl.
| | |
|---|---|
| *G06K 7/10* | (2006.01) |
| *A47J 31/44* | (2006.01) |
| *G06K 7/14* | (2006.01) |
| *G06K 19/06* | (2006.01) |

(52) U.S. Cl.
CPC ...... *G06K 7/10722* (2013.01); *A47J 31/4492* (2013.01); *G06K 7/1413* (2013.01); *G06K 19/06028* (2013.01)

(58) Field of Classification Search
CPC ............ G06K 7/10722; G06K 7/1413; G06K 19/06028; A47J 31/4492

USPC ........................ 235/487, 494, 462.01–462.49
See application file for complete search history.

(56) References Cited

U.S. PATENT DOCUMENTS

2007/0157821 A1* 7/2007 Panesar ............... A47J 31/0673
                                                                                99/279
2011/0240749 A1* 10/2011 Naddor ............ G06K 19/06028
                                                                                235/494

OTHER PUBLICATIONS

Olson ,AprilTag: A robust and flexible visual fiducial system ,Aug. 15, 2011.

* cited by examiner

*Primary Examiner* — Jamara A Franklin
(74) *Attorney, Agent, or Firm* — Winston Hsu

(57) ABSTRACT

A barcode, comprising: a code region, comprising at least bright point and a dark point, comprising code information; and a boundary region, formed as a closed shape surrounding the code region. A decoding direction of the code region is not relative to the boundary region. The code information is represented by at least one of: a color sequence, an intensity sequence and a relation between the bright point and the dark point. The present invention also provides a barcode processing system which can process the barcode to generate a control command, and provides a coffee machine using the barcode processing system. The barcode can be easily aligned by a closed boundary region, without using a frame buffer with a large size.

24 Claims, 8 Drawing Sheets

BAR CODE, BAR CODE READER AND COFFEE MACHINE

CROSS REFERENCE TO RELATED APPLICATIONS

This application claims the benefit of U.S. Provisional Application No. 63/176,899, filed on Apr. 20, 2021, the contents of which are incorporated herein by reference.

BACKGROUND OF THE INVENTION

1. Field of the Invention

The present invention relates to a barcode, a barcode reader, and a coffee machine, and particularly relates to a barcode, a barcode reader, and a coffee machine which can use an align mechanism without increasing a size of a frame buffer.

2. Description of the Prior Art

Conventional barcodes may be classified in 1D barcodes and 2D barcodes. 1D barcodes can only contain few code information. Also, it is hard to align code regions of 2D barcodes, especially when the 2D barcodes are small. Further, the alignment of the 2D barcode may need a frame buffer with a large size.

SUMMARY OF THE INVENTION

One objective of the present invention is to provide a barcode which has a convenient alignment mechanism.

Another objective of the present invention is to provide a barcode reader which can align the barcode without a large frame buffer.

Another objective of the present invention is to provide a coffee machine using a barcode reader which can align the barcode without a large frame buffer.

One embodiment of the present invention provides a barcode, comprising: a code region, comprising at least bright point and a dark point, comprising code information; and a boundary region, formed as a closed shape surrounding the code region. A decoding direction of the code region is not relative to the boundary region. The code information is represented by at least one of: a color sequence, an intensity sequence and a relation between the bright point and the dark point Another embodiment of the present invention provides a barcode processing system, comprising: an image sensor, configured to optically sense a sensed image; and a processing circuit, configured to determine if a closed shape object exists in the sensed image, to identify a code region within the closed shape object in the sensed image, wherein the code region comprises bright points and dark points, wherein the processing circuit generates code information according to at least one of: a color sequence, an intensity sequence and a relation between the bright point and the dark point. A decoding direction of the code region is not relative to the closed shape object.

One embodiment of the present invention provides a coffee machine, comprising the above-mentioned barcode reader, and comprising a capsule container, a liquid injection probe. The capsule container is configured to hold a capsule. A plurality of barcodes, which respectively has the above-mentioned boundary region and the code region, repeats around a top surface of the capsule. The liquid injection probe and the barcode reader faces the top surface, and a distance between the barcode reader and the top surface allows the barcode reader to read at least one complete barcode.

In view of above-mentioned embodiments, the barcode can be easily aligned by a closed boundary region, without using a frame buffer with a large size.

In view of above-mentioned embodiments, the barcode can be easily aligned by a closed boundary region, without using a frame buffer with a large size.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements.

Figure 1:
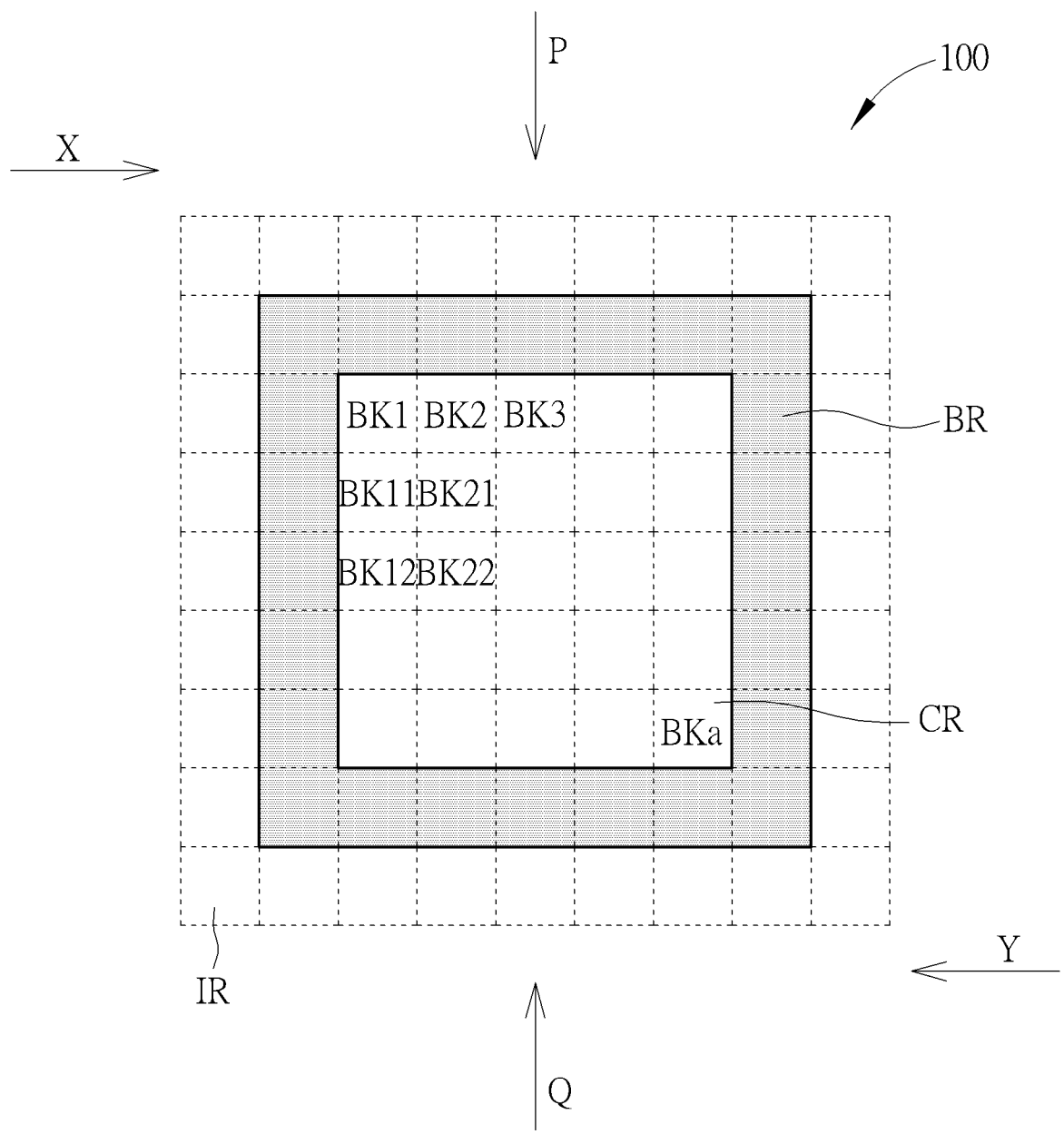
FIG. 1, FIG. 2 and FIG. 3 are schematic diagrams illustrating barcodes according to different embodiments of the present invention.
Figure 2:
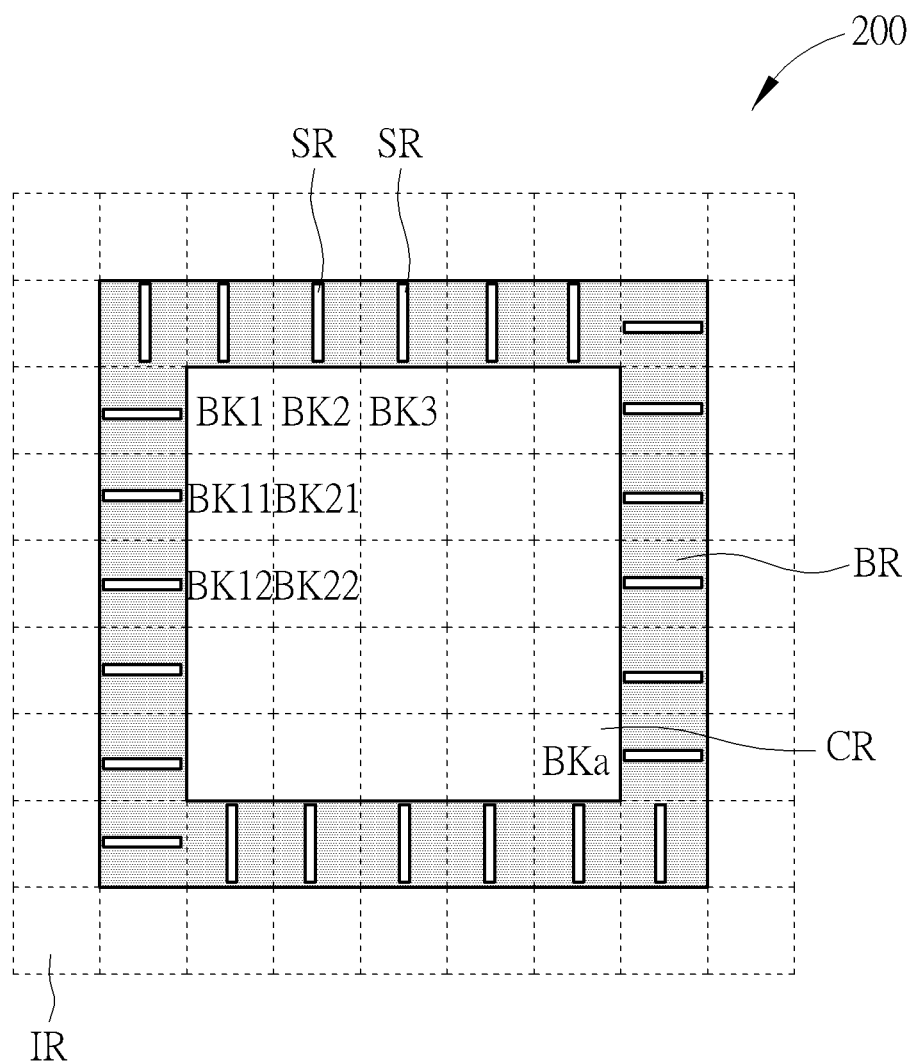
Figure 3:
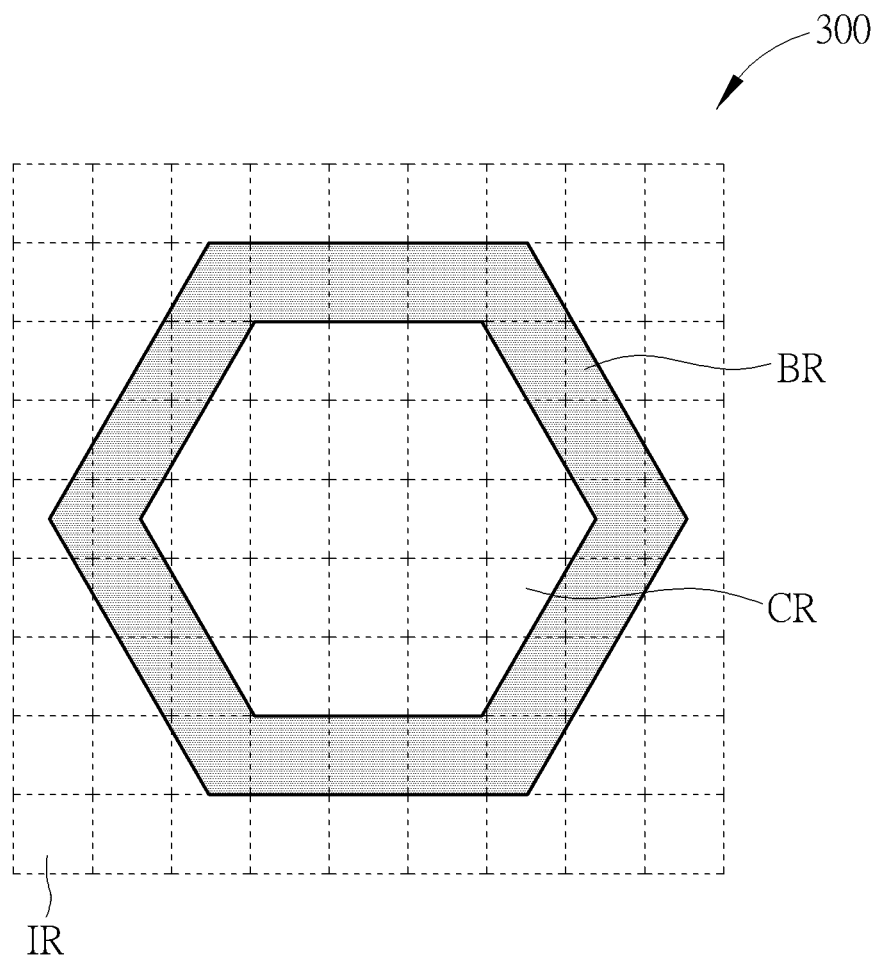

FIG. 1, FIG. 2 and FIG. 3 are schematic diagrams illustrating barcodes according to different embodiments of the present invention. As illustrated in FIG. 1, the barcode 100 comprises a code region CR and a boundary region BR. The code region CR comprises code information. The code information can be acquired by a barcode reader via decoding the code region CR. The boundary region BR is formed as a closed shape surrounding the code region CR. A color sequence or an intensity sequence of the code region CR represents the code information. The intensity sequence means a sequence of intensities, for example, grey values 0-100-50. The code information can mean a plurality of codes. For example, if the code region CR has a color sequence of purple-green-orange, the corresponding code information is 101101. For another example, if the code region CR has an intensity sequence of grey values 0-100-50, the corresponding code information is 011011.

In one embodiment, the code region CR comprises bright points and dark points. The code information can be represented by a ratio between a number of the bright points (NB herein after) and a number of the dark points (ND herein after). For example, if $$\frac{NB}{NB+ND}$$

is 80%, the code information means codes 0011001. For another example, if $$\frac{NB}{NB+ND}$$

is 70%, the code information means codes 0011011. Also, in another embodiment, the code information can be represented by a ratio between an area of total bright points and an area of total dark points.

In view of above-mentioned embodiments, the code information of the code region CR can be represented by at least one of: a color sequence, an intensity sequence and a relation between the bright point and the dark point. For example, the code information of the code region CR can be represented by the color sequence and the intensity sequence, but not according to the relation. For another example, the code information of the code region CR can be represented by the relation, but not according to the color sequence and the intensity sequence. The relation between the bright point and the dark point can be, for example, the ratio between a number of the bright points and a number of the dark points, or the ratio between an area of total bright points and an area of total dark points.

In one embodiment, the code region CR comprises a plurality of blanks BK1, BK11, BK12, BK2, BK21, BK22, BK3, BKa . . . (only eight of them are labeled) coded in color. The blanks BK1, BK11, BK12, BK2, BK21, BK22, BK3, BKa . . . have at least one color, and the color sequence of the code region CR is a color sequence of the blanks BK1, BK11, BK12, BK2, BK21, BK22, BK3, BKa . . . . For example, if the blanks BK1, BK2, BK3 respectively have colors of red, green, blue, a color sequence of the blanks BK1, BK2, BK3 is red-green-blue, thus the code region CR also has a color sequence of red-green-blue. The above-mentioned intensity sequence can also have the same rule.

In one embodiment, the code region CR is decoded following the distribution of blanks. However, the decoding direction can be set by any other method. Also, in one embodiment, a decoding direction of the code region CR is not relative to the boundary region BR. In one embodiment, a size, a location, a color, and a shape of the boundary region BR is not relative with the decoding direction. Further, in one embodiment, the boundary region BR does not have any code information. The boundary region BR may have only one color or more than one colors. In one embodiment, the color (s) of the boundary region BR is identical with a color of the code region CR.

Besides, in one embodiment, identical code information can be acquired if the code region CR is respectively decoded in a first direction and in a second direction opposite to the first direction. The first direction and the second direction can be, for example, the directions X, Y in FIG. 1, or the directions P,Q in FIG. 1. The first direction and the second direction here can start at the same row or start at different rows, depending on the decoding algorithm. For example, the decoding starts at the blank BK1 and follows the direction X, or starts at the blank BKa and follows the direction Y.

The above-mentioned direction can be combined with at least one sub-direction. For example, for the X direction, it can mean the blank BK1 is decoded and then the blank BK2 is decoded. No sub-direction is used in such example. Also, in another example, for the X direction, it can mean the blank BK1 is decoded and then the blanks BK11, BK12 . . . in the same column are decoded (the sub-direction). After all the blanks in the same column as the blank BK1 are decoded, the blank BK2 is decoded and then the blanks BK21, BK22 . . . in the same column of the blank BK2 are decoded. Other directions such as the direction Y, the direction P and the direction Q can follow the same rules.

The "identical code information" mentioned here can mean the code information are really the same. For example, the same code 10101100 is acquired when one code region CR is respectively decoded in two symmetry directions (such as the direction X and the direction Y). However, "identical code information" can mean "the different code information is changed to the same code information, thus identical code information is acquired. For example, the code 10101100 is acquired when the code region CR is decoded in the direction X, and the opposite code 00110101 is acquired when the code region CR is decoded in the direction Y. However, the barcode reader which decodes the code region CR regards the code 00110101 as 10101100, thus the same code information is acquired.

The first direction and the second direction are not limited to be opposite to each other. In one embodiment, identical code information can be acquired if the code region CR is respectively decoded in a first direction and in a second direction. An angle smaller than MY exists between the first direction and the second direction.

In one embodiment, after acquiring the code information, the barcode reader transmits the code information to a control circuit, and then the control circuit correspondingly generates a control command. Therefore, in the above-mentioned embodiments, after the barcode reader acquires different code information which is supposed to mean the same code information, the barcode reader can transform the different code information to transformed code information and then transfer the transformed code information to the control circuit. Thereby the control circuit can generates the same control command even the bar code reader acquires different code information. For example, after the barcode reader acquires the code 10101100 and the code 00110101, the barcode reader transforms the code 00110101 to the code 10101100 and then transfers the code 10101100 to the control circuit. After that, the control circuit generates a control command corresponding to the code 10101100 but not corresponding to the code 00110101.

Oppositely, in another example, the barcode reader directly transfers different code information to the control circuit after acquiring it. Afterwards, the control circuit still generates the same control command even receives different code information. For example, after the barcode reader acquires the code 10101100 and the code 00110101, the barcode reader directly transfers the code 10101100 and the code 00110101 to the control circuit. Then, control circuit still generates an identical control commands while receiving the code 10101100 and receiving the code 00110101.

The control circuit can be provided in a barcode processing system which comprises the above-mentioned bar code reader. The barcode processing can read a barcode via the barcode reader and operates corresponding to the control command provided by the control circuit. The barcode processing system can be, for example, a coffee machine.

The boundary region BR in FIG. 1 is filled with color and has no space region. However, the boundary region BR may have at least one space region, but the barcode reader still determines the boundary region BR is the closed shape while sensing an image comprising the boundary region BR. In other words, the barcode reader ignores the space regions while sensing an image comprising the boundary region BR.

FIG. 2 is a schematic diagram illustrating a barcode 200 comprising a boundary region with space regions SR. As illustrated in FIG. 2, the boundary region BR comprises a plurality of space regions SR (only two of them are labeled). The space regions SR are not limited to be empty regions, white regions or blanks. For example, the space regions SR can be relative small regions compared with other regions of the boundary region BR. Also, the space regions SR may have at least one color different from which of the boundary region BR. Besides, the color (s) of the space regions SR may be the same but darker than the color(s) of the boundary region BR, or be the same but lighter than the color (s) of the boundary region BR. Briefly, the space regions SR may have at least one color which can be visually distinguished from the color(s) of the boundary region BR, no matter observed by an user's naked eyes or distinguished in an image.

Also, the boundary region BR may have space regions SR which have different shapes or sizes. The space regions SR can be regions specially designed in the boundary region BR, or unnecessary regions caused by printing, or unnecessary regions caused by abrasion.

Please refer to FIG. 1 again, besides the above-mentioned boundary region BR and the code region CR, the barcode 100 can further comprises an isolation region IR. The isolation region IR surrounds the boundary region BR, and is for isolating the code region CR and the boundary region BR from another code region CR and another one of the boundary region BR. In other words, the isolation region IR is for isolating the code region CR and the boundary region BR of different barcodes. In one embodiment, the isolation region IR can make the whole barcode to be more obvious from the background image.

In one embodiment, widths of the isolation region IR and the boundary region BR are the same. For example, as illustrated in FIG. 1, the widths of the isolation region IR and the boundary region BR are both a width of the blank.

The boundary region BR is not limited to a square illustrated in FIG. 1. For example, the boundary region BR can be a hexagon as shown in the barcode 300 in FIG. 3. In such case, the code region CR can still have blanks. The blanks in the embodiment of FIG. 3 can be set to be smaller to fill the code region CR with a hexagon shape. Alternatively, in one embodiment, if some regions in the code region CR could not form a complete blank, such regions are ignored while decoding the code region CR. In another embodiment, the boundary region BR can have an irregular shape.

Figure 4:
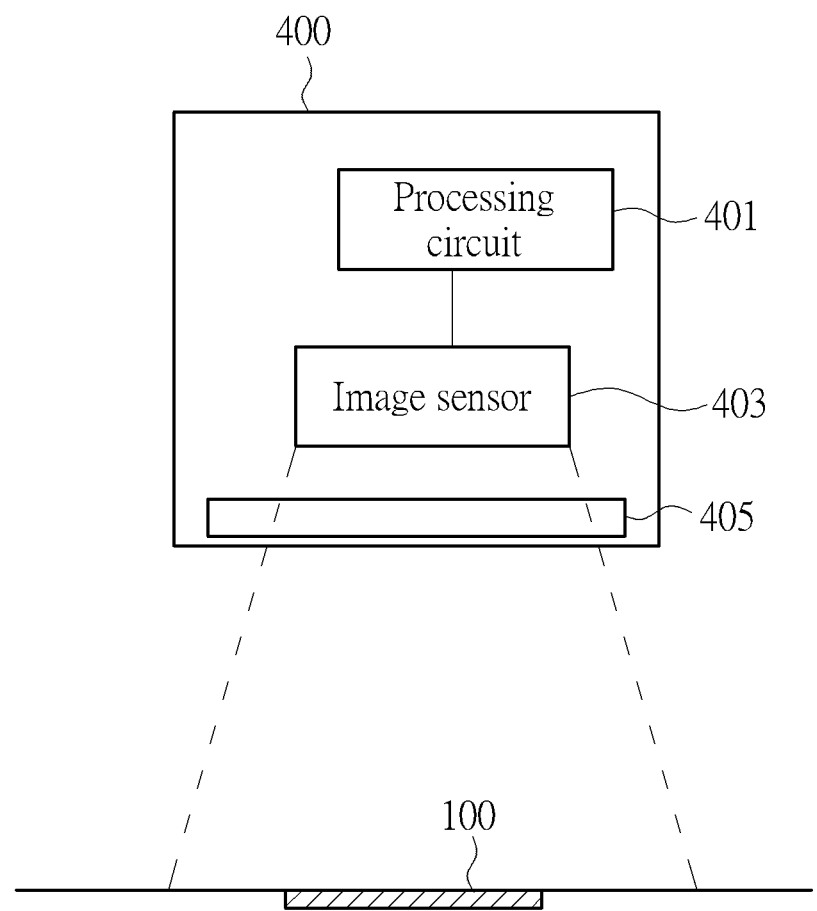
FIG. 4 is a block diagram illustrating a barcode reader according to one embodiment of the present invention.

FIG. 4 is a block diagram illustrating a barcode reader according to one embodiment of the present invention, which can be used for reading the barcode provided by the present invention. As illustrated in FIG. 4, the barcode reader 400 comprises a processing circuit 401 and an image sensor 403. The image sensor 403 is configured to optically sense a sensed image. The processing circuit 401 is configured to determine if a closed shape object (i.e., the above-mentioned boundary region BR) exists in the sensed image, to identify an intensity sequence or a color sequence of a code region CR within the closed shape object in the sensed image, and to generate code information according to the intensity sequence or the color sequence of the code region CR. In other words, if the processing circuit 401 determines the closed shape object exists, it starts decoding the code region CR which is supposed to be inside the closed shape object.

The barcode reader 400 can be provided in an electronic device which has only a barcode reading function, such as the barcode reader used in shops. Also, the barcode reader 400 can be implemented via executing a program by a mobile electronic device. For example, the processing circuit 401 can be a processor of a mobile phone and the image sensor 403 can be a camera of the mobile phone. In such case, an app can be installed to the mobile phone and the processor of the mobile circuit can execute the app to perform functions of the barcode reader 400.

Figure 5:
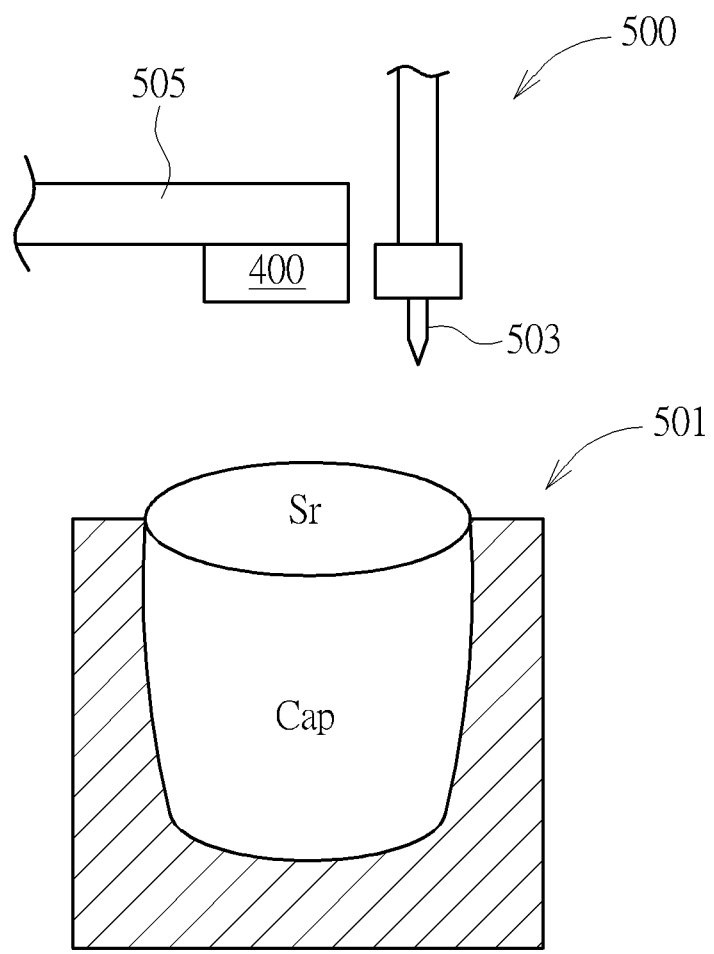
FIG. 5 is a schematic diagram illustrating a coffee machine according to one embodiment of the present invention.

In one embodiment, the barcode reader 400 can be used in a coffee machine. FIG. 5 is a schematic diagram illustrating a coffee machine 500 according to one embodiment of the present invention. As illustrated in FIG. 5, the coffee machine 500 comprises a capsule container 501, a liquid injection probe 503 and the above-mentioned barcode reader 400. The capsule container 501 is configured to hold a capsule Cap. The capsule container 501 can be an independent device especially designed for the capsule Cap, or be a notch formed on any part of the coffee machine 500.

In one embodiment, the liquid injection probe 503 is configured to inject water to the capsule, to brew coffee. The mechanism for fixing the liquid injection probe 503 can change corresponding to different coffee machines. Also, in the embodiment of FIG. 5, the barcode 400 comprising structures and functions the same as which shown in FIG. 4 is fixed on a shelf 505 in the coffee shop 500, but not limited.

Figure 6:
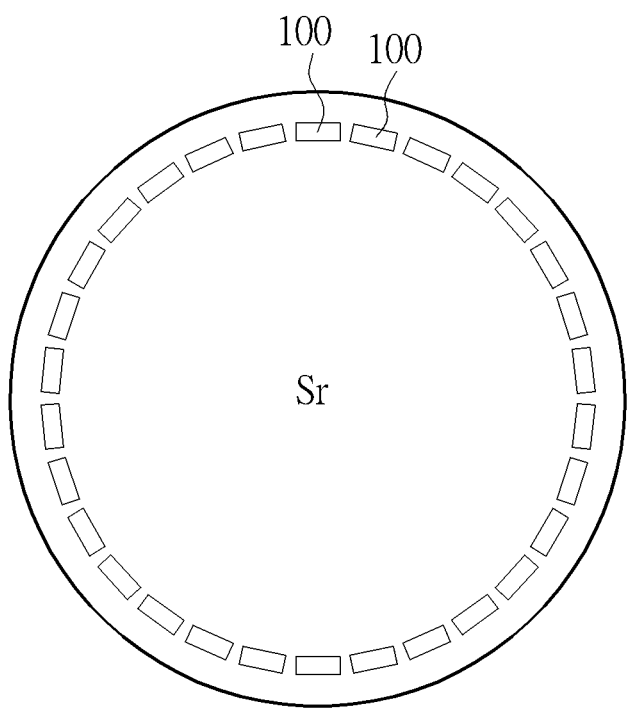
FIG. 6 is a schematic diagram illustrating barcodes on a top surface of a capsule according to one embodiment of the present invention.

In one embodiment, a plurality of barcodes 100 repeats around a top surface Sr of the capsule Cap, as shown in FIG. 6. In such case, the liquid injection probe 503 and the barcode reader 400 faces a top surface Sr of the capsule Cap, and a distance between the barcode reader 400 and the top surface Sr allows the barcode reader 400 to read at least one complete barcode 100. Please note, although the barcode 100 is used as an example for explaining the embodiments in FIG. 5, FIG. 6, the barcode 100 can be replaced by other barcodes.

Please refer to FIG. 1 again, the sizes of blanks BK1, BK11, BK12, BK2, BK21, BK22, BK3, BKa ... can be set corresponding to the width of the boundary region BR. For example, in one embodiment, the widths of blanks BK1, BK11, BK12, BK2, BK21, BK22, BK3, BKa can be identical with the width of the boundary region BR.

Figure 7:
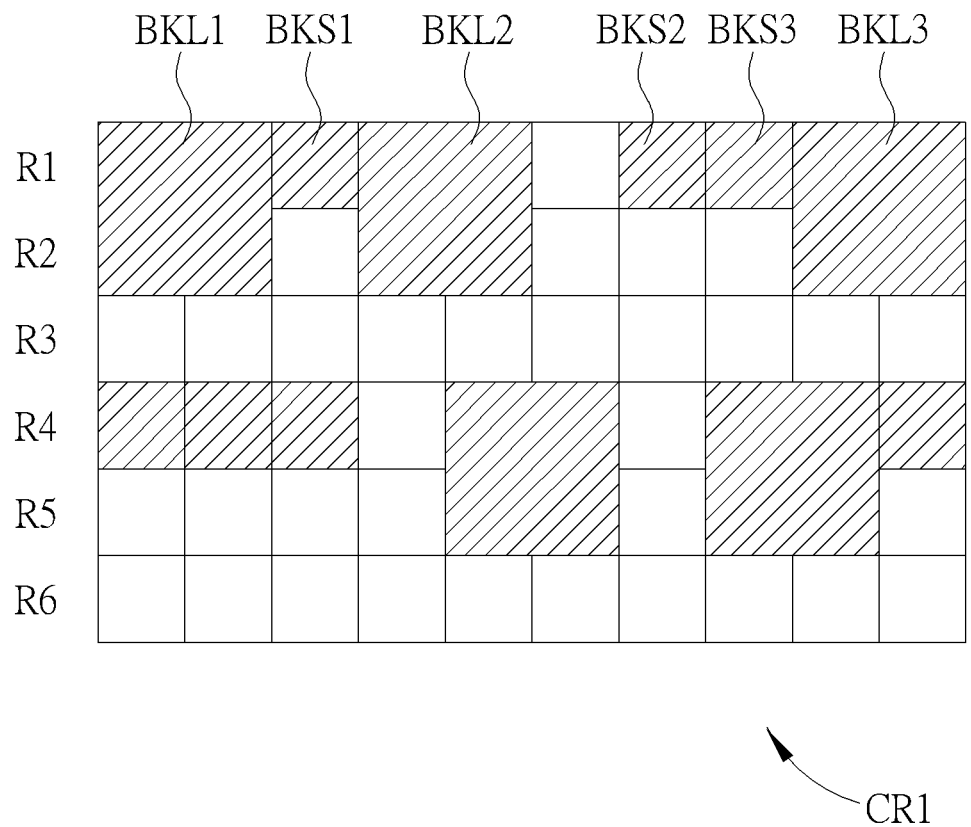
FIG. 7 and FIG. 8 are schematic diagrams illustrating code regions according to different embodiments of the present invention.
Figure 8:
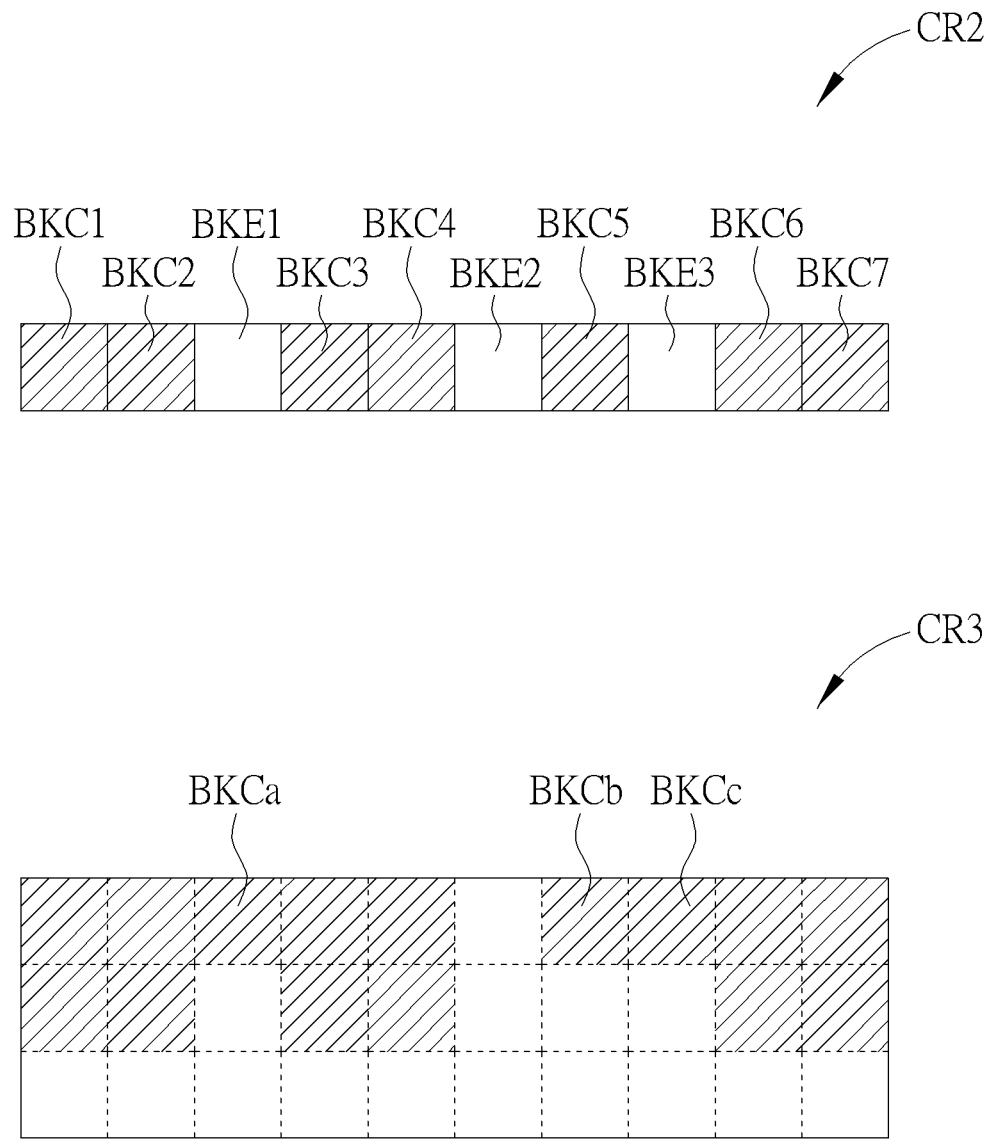

Also, besides the code region illustrated in FIG. 1, the present invention further provides other code regions. FIG. 7 and FIG. 8 are schematic diagrams illustrating code regions according to different embodiments of the present invention. In the embodiments of FIG. 7 and FIG. 8, the code region comprises coded blanks which are marked by slashes, and comprises empty blanks. The coded blanks may represent a code number, and the empty blank represents no code thus represents 0. Please note the empty blank may have a specific color rather than limited to be empty.

In the embodiment of FIG. 7, the code region CR1 comprises coded blanks with different sizes. For example, the code region CR1 comprises large coded blanks BKL1, BKL2, BKL3, and small coded blanks BKS1, BKS2, BKS3. The large coded blanks BKL1, BKL2, BKL3 and small coded blanks BKS1, BKS2, BKS3 have different colors with the empty blanks in FIG. 7. Further, in the embodiment of FIG. 7, rows of full empty blanks, such as the rows R3 and R6, do not represent any code and are used for separating the coded blanks in the code region CR1, to form sub-code regions. Therefore, following such rule, the coded blanks in rows R1 and R2 form a sub-code region, and the coded blanks in rows R4 and R5 form another sub-code region.

The large coded blanks BKL1, BKL2, BKL3 in the embodiment of FIG. 7 represent one code number (2 in this embodiment), and the small coded blanks BKS1, BKS2, BKS3 in the embodiment of FIG. 7 represent another code number (1 in this embodiment). If only the empty blank exists in a column the sub-code region, it represents no code thus is 0. Therefore, the rows R1 and R2 represent a code of 2 (BKL1)-1(BKS1)-2(BKL2)-0(empty blanks)-1(BKS2)-1 (BKS3)-2(BKL3). Following the same rule, the rows R4 and R5 represent a code of 11102021.

In the embodiment of FIG. 8, only the coded blanks following a specific arrangement represent a code number, otherwise the coded blank is ignored. For example, the code region CR2 of FIG. 8 comprises coded blanks BKC1, BKC2, BKC3, BKC4, BKC5, BKC6, BKC7, and comprises empty blanks BKE1, BKE2, BKE3. Further, in the embodiment of FIG. 8, two continuous coded blanks represent the code number 1, otherwise the coded blank is ignored. Therefore, in the embodiment of FIG. 8, the coded blanks BKC1, BKC2 represent a code number 1, the empty blank BKE1 represents no code thus is 0, the coded blanks BKC3, BKC4 represent a code number 1, the empty blank BKE2 represents no code thus is 0, the coded blank BKC5 is ignored, the empty blank BKE3 represents no code thus is 0, and the coded blanks BKC6, BKC7 represent a code number 1. Therefore, the code region CR2 in FIG. 8 represents a code 101001.

The above-mentioned specific arrangement is not limited to which of the code region CR2. As illustrated in the code region CR3 of FIG. 8, only the coded blanks form a square comprising four coded blanks represent a code number (1 in this example), and others are ignored. Therefore, the coded blanks BKCa, BKCb, BKCc in the code region CR3 are ignored, and the code region CR3 represents a code 1101.

In view of above-mentioned embodiments, the barcode can be easily aligned by a closed boundary region, without using a frame buffer with a large size.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A barcode, comprising:
a code region, comprising at least bright point and a dark point, comprising code information; and
a boundary region, formed as a closed shape surrounding the code region;
wherein a decoding direction of the code region is not relative to the boundary region;
wherein the code information is represented by at least one of: a color sequence, an intensity sequence and a relation between the bright point and the dark point.

2. The barcode of claim 1, wherein the code region comprises a plurality of blanks, wherein the blanks have at least one color, and the color sequence of the code region is a color sequence of the colors of the blanks.

3. The barcode of claim 1, wherein the boundary region has only one color.

4. The barcode of claim 3, wherein the color of the boundary region is identical with a color of the code region.

5. The barcode of claim 1, wherein a size, a location, a color, and a shape of the boundary region is not relative with the decoding direction.

6. The barcode of claim 5, wherein the boundary region does not have any code information.

7. The barcode of claim 5, wherein identical code information can be acquired if the code region is respectively decoded in a first direction and in a second direction opposite to the first direction.

8. The barcode of claim 1, further comprising:
an isolation region, surrounding the boundary region, for isolating the code region and the boundary region from another one of the code region and another one of the boundary region.

9. The barcode of claim 1, wherein the boundary region has at least one color and has no space region.

10. The barcode of claim 1, wherein the boundary region comprises at least one space region.

11. The barcode of claim 10, wherein a barcode reader still determines the boundary region is the closed shape while sensing an image comprising the boundary region.

12. A barcode processing system, comprising:
an image sensor, configured to optically sense a sensed image; and
a processing circuit, configured to determine if a closed shape object exists in the sensed image, to identify a code region within the closed shape object in the sensed image, wherein the code region comprises bright points and dark points, wherein the processing circuit generates code information according to at least one of: a color sequence, an intensity sequence and a relation between the bright point and the dark point;
wherein a decoding direction of the code region is not relative to the closed shape object.

13. The barcode processing system of claim 12, wherein the code region comprises a plurality of blanks, wherein the blanks have at least one color, and the color sequence of the code region is a color sequence of the colors of the blanks.

14. The barcode processing system of claim 12, wherein the closed shape object has only one color.

15. The barcode processing system of claim 14, wherein the color of the closed shape object is identical with a color of the code region.

16. The barcode processing system of claim 12, wherein a size, a location, a color, and a shape of the closed shape object is not relative with the decoding direction.

17. The barcode processing system of claim 16, wherein the closed shape object does not have any code information.

18. The barcode processing system of claim 16, wherein identical code information can be acquired if the code region is respectively decoded in a first direction and in a second direction opposite to the first direction.

19. The barcode processing system of claim 12, wherein the closed shape object has at least one color and has no space region.

20. The barcode processing system of claim 12, wherein the closed shape object comprises at least one space region.

21. The barcode processing system of claim 20, wherein the processing circuit still determines the closed shape object has a full closed shape while image sensor senses an image of the closed shape object.

22. The barcode processing system of claim 12, further comprising:
a control circuit, configured to generate a control command to control the barcode processing system according to the code information;
wherein the code information comprises at least one code;

wherein if a barcode reader receives a plurality of the codes but the codes are different, the barcode reader transforms at least one of the codes to at least one transformed code and then transfer the transformed code information to the control circuit;

wherein the control circuit can generate the control command according to the transformed code.

23. The barcode processing system of claim 12, further comprising:

a control circuit, configured to generate a control command to control the barcode processing system according to the code information;

wherein the code information comprises at least one code;

wherein if a barcode reader receives a plurality of the codes but the codes are different, the barcode reader directly transfers the codes to the control circuit;

wherein the control circuit generates an identical one of the control command corresponding to the codes.

24. A coffee machine, comprising:

a capsule container, configured to hold a capsule;

a liquid injection probe;

a barcode reader, comprising:

an image sensor, configured to optically sense a sensed image; and a processing circuit, configured to determine if a closed shape object exists in the sensed image, to identify a code region within the closed shape object in the sensed image, wherein the code region comprises bright points and dark points, herein the processing circuit generates code information according to at least one of: a color sequence, an intensity sequence and a relation between the bright point and the dark point;

wherein a decoding direction of the code region is not relative to the closed shape object;

wherein a plurality of barcodes respectively comprising the closed shape object and the code region repeats around a top surface of the capsule;

wherein the liquid injection probe and the barcode reader faces the top surface, and a distance between the barcode reader and the top surface allows the barcode reader to read at least one complete barcode.

* * * * *